UNITED STATES PATENT OFFICE.

IANTHIS J. ROLFE AND JOSIAH ROGERS, OF NEVADA CITY, CALIFORNIA.

IMPROVEMENT IN MANUFACTURE OF ALCOHOLIC SPIRITS.

Specification forming part of Letters Patent No. 123,423, dated February 6, 1872.

SPECIFICATION.
*To all whom it may concern:*

Be it known that we, I. J. ROLFE and JOSIAH ROGERS, of Nevada City, county of Nevada, State of California, have invented or discovered a new Material and Process for Producing Spirits; and we do hereby declare that the following specification gives a full and clear history of the said material, together with the process employed for producing the said spirit.

Our invention or discovery relates to a new material, from which a superior article of spirits can be produced, possessing a flavor peculiar to itself, and which will be valuable in the manufacture of ardent spirits.

The material from which we manufacture spirits is the berry of the manzanita. The bush which bears this berry grows spontaneously in great abundance throughout the State of California and the countries lying south of it. The berry is about the size of an ordinary pea, and is borne in great profusion upon the bushes. When ripe they can be gathered at an expense of from fifty to seventy-five cents per one hundred pounds; and, not being perishable like other fruits, they can be stored and kept for a long time before working them into spirits.

The process which we employ, in order to produce spirits from this berry, is as follows: After being picked, we winnow or otherwise separate the leaves and stems from the berries. We then put them in a vessel and pound or otherwise macerate them, after which they will be found to be in a dry powdered state. Water is then added to the mass, and it is left to ferment, which it will do in the usual time. We then proceed according to the ordinary process of distillation, and the product will be a spirit of excellent flavor, suitable for all the various purposes of the druggist and dealer in ardent spirits, which can be produced at a very small cost compared with spirits made from cultivated and perishable fruits.

Having thus described our invention or discovery, what we claim, and desire to secure by Letters Patent, is—

1. The process above described for producing fermentation of the macerated manzanita-berry.
2. The process above described for producing spirits from the manzanita-berry.
3. The product resulting from the distillation of the manzanita-berry.

In witness whereof we have hereunto set our hands and seals.

IANTHIS J. ROLFE. [L. S.]
JOSIAH ROGERS. [L. S.]

Witnesses:
GEO. S. S. GETCHELL,
WILLIAM R. COE.